United States Patent [19]

Henriott et al.

[11] Patent Number: 4,535,703
[45] Date of Patent: Aug. 20, 1985

[54] WIRE OR LINE MANAGER

[75] Inventors: Jay M. Henriott; David L. Hostetter, both of Jasper, Ind.

[73] Assignee: Kimball International, Inc., Jasper, Ind.

[21] Appl. No.: 509,958

[22] Filed: Jun. 30, 1983

[51] Int. Cl.³ .......................... A47C 35/00; H02G 3/04
[52] U.S. Cl. ........................................ 108/50; 174/48; 312/223
[58] Field of Search ............... 108/50, 27, 23; 174/48, 174/49, 68 C, 70 C; 312/223

[56] References Cited

U.S. PATENT DOCUMENTS

| | | | |
|---|---|---|---|
| 1,984,356 | 12/1934 | Abbott | 174/49 |
| 4,094,256 | 6/1978 | Holper et al. | 108/50 |
| 4,094,561 | 6/1978 | Wolff et al. | 312/223 |
| 4,255,610 | 3/1981 | Texforis | 174/48 |
| 4,323,291 | 4/1982 | Ball | 312/223 |
| 4,372,629 | 2/1983 | Propst et al. | 312/223 |
| 4,406,101 | 9/1983 | Heidmann | 174/48 |
| 4,433,630 | 2/1984 | Laborie | 108/50 |

OTHER PUBLICATIONS

Steelcase Series 9000 Brochure.
JG Furniture Systems Brochure.

Primary Examiner—William E. Lyddane
Assistant Examiner—Mark W. Binder
Attorney, Agent, or Firm—Jeffers, Irish & Hoffman

[57] ABSTRACT

A wire or line manager is adapted to be attached to the edge of a work surface and to extend between the work surface and a wall to provide neat and aesthetic management of numerous electrical lines, data and signal cables and plugs associated with various electrical and communications apparatuses. The manager comprises a flange support connectable to the work surface edge and has a rigid lower flange and a flexible upper flange extending outwardly therefrom and toward the wall. Electrical lines, data and signal cables and plugs may then be easily and neatly passed between the flexible upper flange and the wall and run laterally along the lower flange between the work surface and wall. A plurality of openings are provided in the lower flange so that any one or more lines may be selectively received through an opening or openings to be run generally vertically downwardly to selected areas.

16 Claims, 6 Drawing Figures

WIRE OR LINE MANAGER

BACKGROUND OF THE INVENTION

The invention pertains to the orderly management of electrical and data or signal lines of typewriters, telephones, dictating machines, calculators, computer terminals and the like associated with office spaces, and more particularly to a wire or line manager connected to the edge of a work surface and extending between the edge and a wall for vertically and horizontally routing electrical lines therebetween.

There are numerous wires, cables and electrical lines associated with office spaces, and particularly with the modern modular offices that are designed to compactly arrange a large number of electrical apparatuses in a small space and in which the work surfaces and cabinets are hung on portable partition panels. Representative of such apparatuses are dictating machines, calculators, telephones, word processors and printers, typewriters, and the like. A major problem associated with such an arrangement is the unsightly view and annoying presence of these lines as they lie on the work surface top while proceeding toward openings in the corners and become entangled beneath the work surface. Such a situation is both physically annoying and aesthetically unpleasing to working personnel and may contribute to their decreased productivity.

One method attempting to neatly arrange the placement of electrical lines provides holes or slots through the working surface through which the lines could be passed. Disadvantages with this arrangement exist in that the holes or slots require a custom finish or some type of ornamental cover, thereby unnecessarily increasing cost. Moreover, if the holes or slots are precut, limited versatility is provided to the user in managing the placement and routing of electrical lines about office furniture. For example, if office electrical apparatuses cannot be conveniently located near an opening or a slot, then their associated electrical lines must be undesirably extended to the nearest hole or slot.

Furthermore, if the holes or slots are not precut, but are cut after installation of the office furniture and equipment, the later addition of more or newer electrical equipment places the user in the position of again having limited versatility in routing the electrical wires of the new equipment.

Another earlier attempt to solve the above problem involved moving the work surface away from the wall or partition panel either by physically shifting the work surface forwardly or by cutting a portion of the work surface edge away, and connecting an L-shaped channel on the work surface edge with the horizontally disposed portion extending toward and against the wall. Electrical lines were then placed between the work surface edge and the wall and run along the channel's horizontal portion disposed below the top surface of the work surface. In spite of eliminating the provision of holes or slots in the work surface, other disadvantages were created by use of the L-shaped channel. Two such disadvantages are that the L-shaped channel is not aesthetically pleasing, and tends to collect dust, pencils, paper clips, and the like.

To eliminate the above disadvantages, the L-shaped channel can be attached at a higher position on the work surface edge so that the vertically disposed portion of the channel extends a predetermined distance above the top surface, thereby preventing pencils, paper clips, and the like from collecting in the channel. However, this was found to result in an unsightly metal line or border along the work surface, and since the top edge of the vertical portion of the channel was rough, it required finishing to be acceptable to the user, thereby increasing production costs.

In view of this, it is evident that there still exists a need for a means of efficiently and aesthetically routing electrical lines associated with modern modular offices.

SUMMARY OF THE INVENTION

The present invention overcomes the above described problems and disadvantages by providing a wire or line manager that may be connected to the work surface edge or the wall for efficiently and aesthetically managing the arrangement of numerous electrical lines.

The line manager eliminates any necessity of cutting holes or slots in the work surface by providing a flexible upper flange which extends between the work surface edge and the wall. Because the upper flange is flexible, electrical lines and enlarged plugs and connectors may be passed at any point along the work surface edge between the edge and the wall, thereby yielding virtually unlimited versatility in running lines.

In addition to the flexible upper flange, there is also provided a rigid lower flange which extends between the work surface edge and the wall for supporting electrical lines run therealong. The rigid lower flange has a plurality of openings disposed therein along its length for receiving selected ones of the lines therethrough to route the lines to a selected area, such as an electrical outlet.

The flexible upper flange is positioned to be substantially coplanar with the top surface of the work surface to present an aesthetically pleasing view to the eye and to prevent the accumulation of pencils, paper clips, and the like between the work surface and the wall.

In one form of the invention there is provided a work station apparatus comprising a work surface having a top surface and an edge, and a wall spaced apart from a portion of the work surface edge. A line manager or trough is attached to either the edge portion or the wall so as to extend therebetween. The line manager or trough includes a rigid lower flange extending between the edge portion and wall and in close proximity to the other one of the edge portion and wall, and a flexible upper flange extending towards the wall. Numerous electrical lines and data cables and plugs associated with telephones, typewriters, calculators, computer terminals dictating machines, and the like can be run at any point between the wall and the flexible upper flange and along the lower rigid flange to selected areas, thereby eliminating the disorderly arrangement of entangled lines above and below the work surface.

It is an object of the present invention to provide an improved apparatus for managing numerous electrical lines associated with electrical office equipment.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with accompanying drawings, wherein.

DESCRIPTION OF A PREFERRED EMBODIMENT

Figure 1:
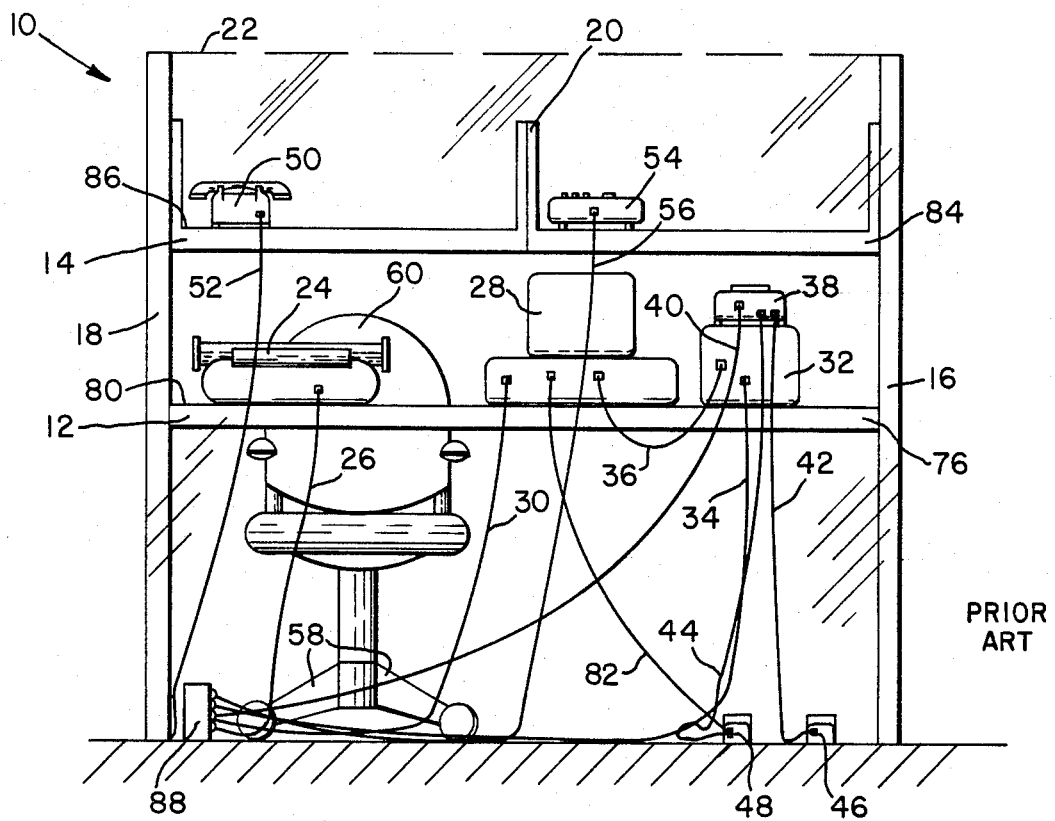
FIG. 1 is a front elevational view of a modular office assembly illustrating the normal arrangement of electrical lines associated with various electrical office equipment.

There is illustrated in FIG. 1 a modular office 10 comprising lower work surface 12 and overhead shelves 14 each hung on rear panel or wall 22 and connected between side panels or walls 16, 18, and overhead shelves 14 are provided with a dividing panel 20. An example of a modular office system of this type is the ARTEC Partition System manufactured by Kimball International, Inc. Modular office 10 is arranged against wall 22, which is illustrated in dashed lines, and has numerous electrical office equipment items arranged thereon. For example, lower work surface 12 supports typewriter 24 having electrical line 26, computer keyboard and monitor or video tube 28 having electrical line 30 and data cables, magnetic card reader 32 having electrical line 34 and electrical cord 36 connecting reader 32 to keyboard and video tube 28, and dictating machine 38 having electrical line 40 and cords 42, 44 connected to operating pedals 46, 48, respectively. Overhead shelves 14 may likewise have other electrical office equipment such as telephone 50 having signal line 52 and calculator 54 having electric line 56. As illustrated, the electrical lines 26, 30, 34, 40, and 56 cords 36, 42, 44, 52 are loosely arranged in the usual manner. Naturally, modular office 10 can comprise additional side walls 16, 18 supporting additional work surfaces 12, 14 for supporting numerous other types of electrical office equipment and the electrical lines associated therewith. In such a case, as the loose arrangement of lines become increasing entangled, modular office 10 becomes increasingly aesthetically unpleasing, and the entangled lines create an annoying distraction to the user, particularly when the lines become entangled about legs 58 of chair 60 and the feet of the user.

Figure 3:
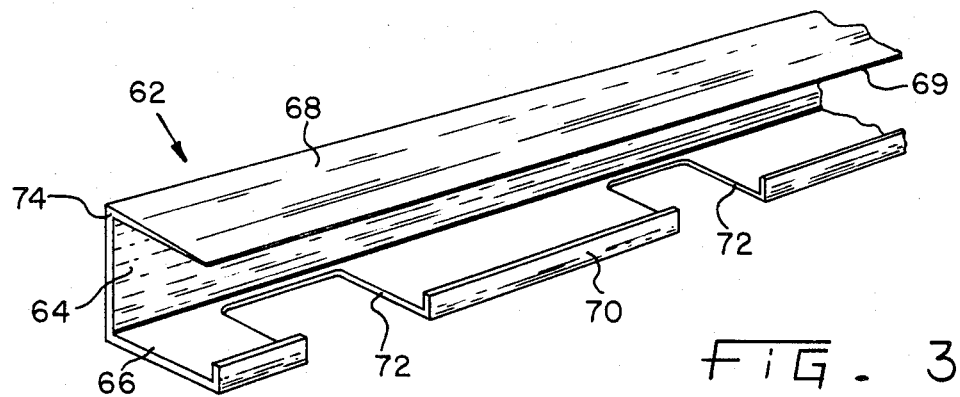
FIG. 3 is a broken-away perspective view of a preferred embodiment of the present invention.

FIG. 3 illustrates wire or line manager 62 of the present invention and comprises a generally elongate back flange support 64 having a substantially rigid lower flange 66 and flexible upper flange 68 extending outwardly therefrom as illustrated. Lower flange 66 has a rim 70 extending upwardly from its remote edge portion and a plurality of openings 72 disposed therein. Rim 70 serves several purposes, such as providing increased strength to rigid lower flange 66 and acting as a curb or stop for lines and cords carried by manager 62.

In addition to providing the desirable feature of efficient management of lines and cords, manager 62 is simply and economically produced by coextruding polyvinyl chloride or other suitable polymeric material; flange support 64 and lower flange 66 are extruded from a composition of rigid polyvinyl chloride, while upper flange 68 is extruded from a composition of flexible polyvinyl chloride. Although polyvinyl chloride is preferred, other plastics may be used in coextruding manager 62, and care should be taken in selecting a plastic to insure that upper flange 68 and flange support 64 are securely joined at juncture 74.

Manager 62 need not be coextruded in that flange support 64, lower flange 66, and upper flange 68 can be separate elements connected together in any suitable manner.

Figure 4:
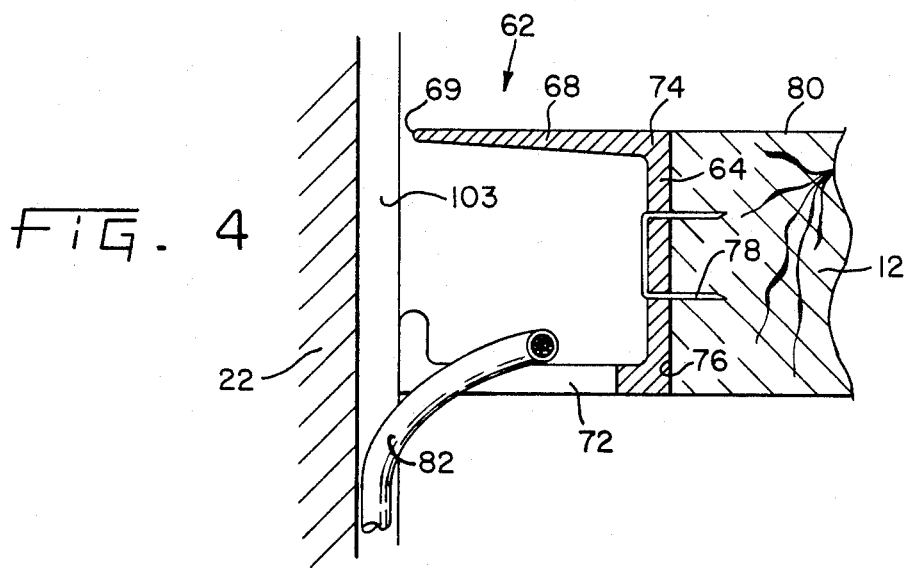
FIG. 4 is a broken-away, transverse sectional view of a preferred embodiment of the present invention connected to the edge of a work surface.

Referring now to FIG. 4, manager 62 is illustrated as connected to edge 76 of lower work surface 12 by means of staple 78. Naturally, other means are available for connecting manager 62 to edge 76, for example, screws, adhesives, and the like. Regardless of the manner in which manager 62 is connected to edge 76, it is preferred that upper flange 68 and top surface 80 of work surface 12 be substantially coplanar for the sake of appearance.

With manager 62 connected to work surface 12, work surface 12 is then positioned with wall 22 such that rim 70 of lower flange 66 is in close proximity to wall 22. In using the phrase "close proximity", it is meant that rim 70 may abut wall 22 or be slightly spaced there apart a distance which is preferably slightly less that the smallest diameter of a line or cord to be carried by manager 62; however, the distance may be greater since rim 70 will act as a curb or stop to prevent lines or cords from falling between rim 70 and wall 22.

As mentioned above, it is preferred that rim 70 abut against wall 22, and in doing so rigid lower flange 66 with rim 70 serves as a positive stop or positioning mechanism in adjusting work surface 12 relative to wall 22; rim 70 serving to increase the rigidity of lower flange 66 to provide a more positive positioning mechanism.

Figure 5:
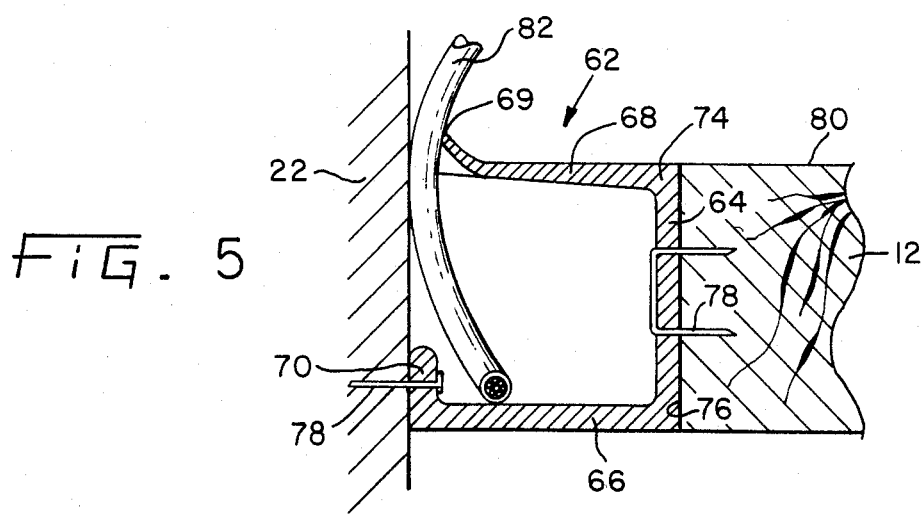
FIG. 5 is similar to FIG. 4 illustrating an electrical line received within the embodiment of FIG. 4.

Referring to FIG. 5, a cord or line 82 is illustrated positioned between wall 22 and flexible upper flange 68 and supported or carried by rigid lower flange 66. The edge 69 of flange 68 should be in close proximity to wall 22, that is, either in abuttment with wall 22 or spaced slightly therefrom. Forming upper flange 68 slightly shorter than lower flange 66 so as to be spaced apart from wall 22 permits line 82 to be easily and neatly run between flange 68 and wall 22 without creating a large dip or bulge at the remote end of upper flange 68. Although spacing flange 68 from wall 22 is preferred, it could abut wall 22 because its flexibility will still permit wires to be run behind it. Accordingly, the flexibility of upper flange 68 not only permits line 82 to be easily positioned between flange 68 and wall 22, but may also serve to pinch or squeeze line 82 against wall 22 to prevent line 82 from freely moving and to provide aesthetic management of numerous cords or lines 82. Moreover, since the complete length of upper flange 68 is flexible, cord or line 82 may be passed between flange 68 and wall 22 at any point along flange 68, thereby providing unlimited versatility in cord and line management.

Further versatility is provided by openings 72 in lower flange 66 since a single or numerous cords or lines 82 may be run through a selected opening 72 so as to generally vertically run to a selected area.

Figure 2:
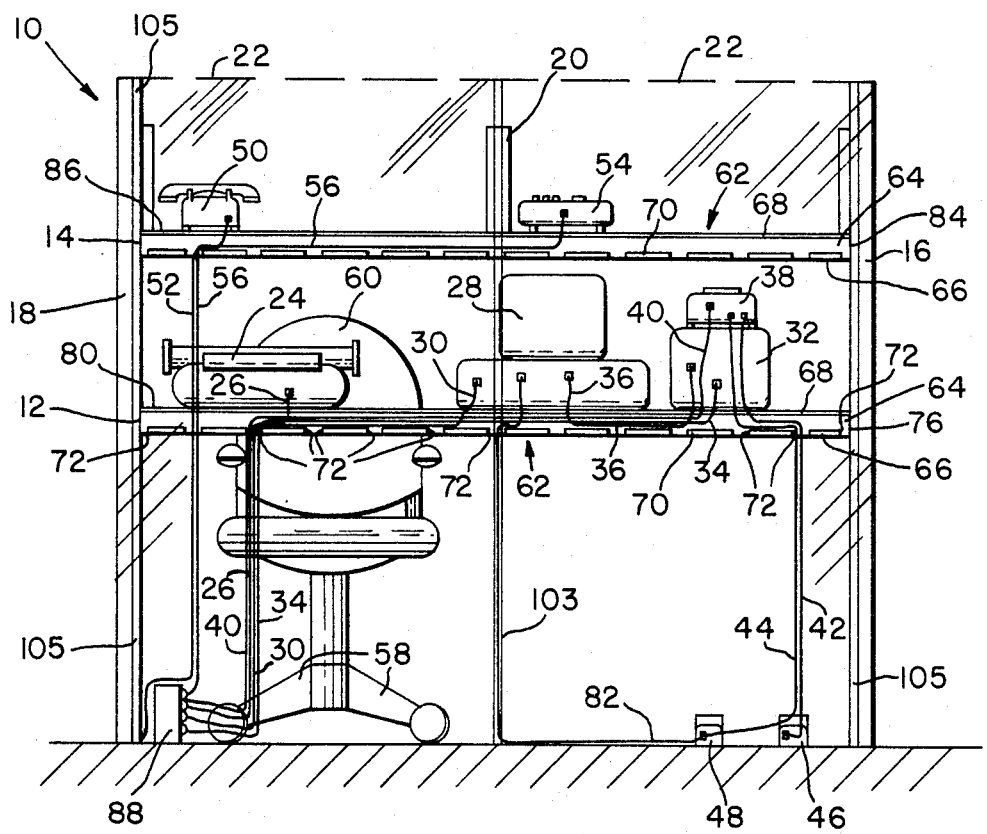
FIG. 2 is similar to FIG. 1 illustrating the orderly arrangement of the electrical lines provided by a preferred embodiment of the present invention.

Referring now to FIG. 2, modular office 10 is illustrated incorporating manager 62 on edge 76 of lower work surface 12 and edge 84 of overhead shelves 14. At both edges 76, 84, upper flanges 68 of managers 62 are substantially coplanar with top surface 80 and top surface 86, respectively. As can be clearly seen in FIG. 2, lines 40, 34, 30, and 26 have been inserted between upper flange 68 and wall 22 at respective points along the length of manager 62 connected to edge 76 and together are run from right to left along lower flange 66. FIG. 2 illustrates lines 40, 34, 30, and 26 as being vertically disposed relative to each other for purposes of illustration only. Lines 40, 34, 30, and 26 with their electrical plugs are then received through a single opening 72 in lower flange 66 and are run vertically downwardly therefrom to electrical outlet 88.

In a like manner, cords 42 and 44 for foot pedals 46 and 48, respectively, are run at different points between flexible upper flange 68 and wall 22 and along lower flange 66 through another opening 72 and then vertically run downwardly to pedals 46, 48. Cord 36 electrically connecting magnetic card reader 32 and keyboard and screen 28 illustrates the flexibility manager 62 provides in managing lines and cords in that cord 36 is passed vertically downwardly between upper flange 68 and wall 22 from magnetic card reader 32 and then laterally right to left along lower flange 66 and then vertically upwardly between upper flange 68 and wall 22 at a different point along flange 68 to keyboard and video tube 28.

Manager 62 connected to edge 84 of overhead shelves 14 provides similar management to lines 52 and 56 of telephone 50 and calculator 54, respectively.

As described above, it is clear that manager 62 not only provides an efficient means of managing cords and lines, thereby removing annoying entanglement with objects such as chair 60 and legs and feet of the user, but also lends an aesthetically pleasing appearance to modular office 10, both of which may be easily appreciated by comparing FIG. 1 with FIG. 2.

Further aesthetic features are provided by manager 62 when upper flange 68 is made of a plastic material color coded to the top surface of the work surface to which it is attached. Also, since upper flange 68 is substantially coplanar with the top surface of the work surface, a smooth continuous surface is presented between the particular work surface and wall 22, and also eliminates the disadvantage of pens, paper clips and the like from becoming lodged between the particular work surface and wall 22.

If desired, manager 62 may be attached to wall 22 instead of edges 76 and 84 by inserting staple 78 through rim 70 and into wall 22. Rim 70 may also be produced so as to extend further upwardly along wall 22 to present a greater surface in attaching manager 62 to wall 22. However, it is preferred that manager 62 be attached to the edge of the particular work surface since the work surface will generally at some time in the future be moved to a different location.

Figure 6:
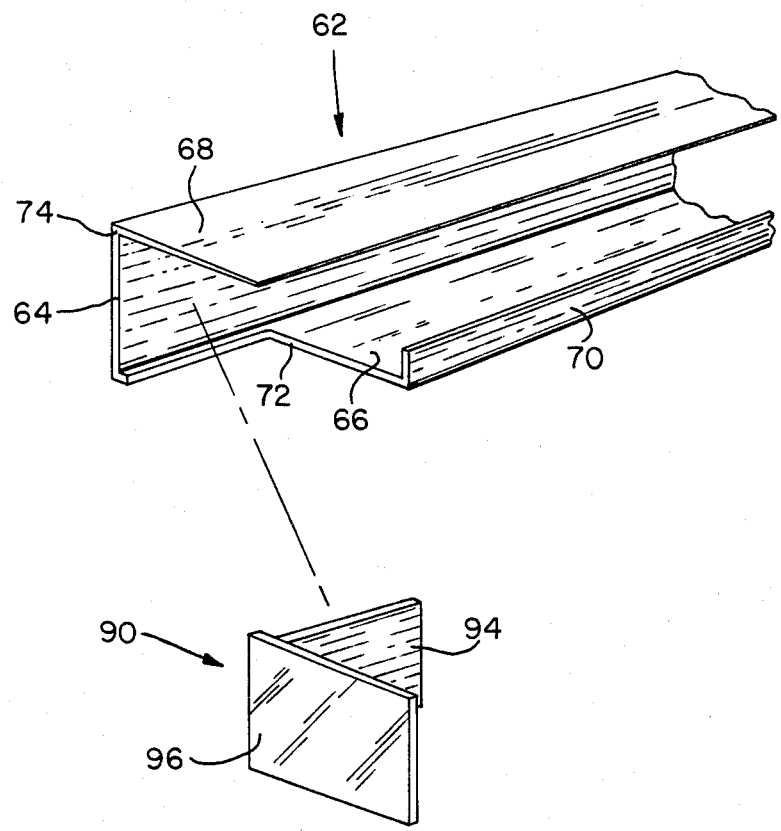
FIG. 6 illustrates the decorative end cover for a preferred embodiment of the present invention.

FIG. 6 illustrates a decorative end cover 90, that is attached to the ends of manager 62 for a aesthetic purposes. Surface 94 of cover 90 is attached with staples or adhesive to flange support 64 so that surface 96 covers the end of manager 62.

If desired, the wires, such as wire 82 (FIG. 2) may be run up through a vertical groove 103 or cord managers between adjacent panels 22 or vertical grooves 105 or cord managers at the corners of panels 22 and 16,18 in order to hide wire 82. Certain ones of the openings 72 are strategically located at grooves 103,105.

While this invention has been described has having a preferred embodiment, it will be understood that it is capable of further modifications. This application is therefore intended to cover any variations, uses, or adaptations of the invention following the general principles thereof, and including such departures from the present disclosure as come within known or customary practice in the art to which this invention pertains and fall within the limits of the appended claims.

What is claimed is:

1. In a work station including a work platform having a top surface and an edge,
   a wall member disposed adjacent to and spaced apart from said edge, and
   a line-supporting trough disposed in the space between said edge and said wall member and comprising:
   a support member secured to said edge,
   said line-supporting trough including a rigid lower flange member connected to said support member and extending between said edge portion and said wall member and a flexible upper flange member secured to said support member and extending towards said wall member and having an edge portion thereof spaced apart from said wall member, said upper flange forming a continuous coplanar surface with said work surface whereby electrical lines from electrical appliances and the like can be run in said trough from any point between said wall member and said flexible upper flange member and along said rigid lower flange member to selected areas.

2. The line manager of claim 1 wherein said support member is adapted to be attached to the edge portion, and further including a rim member generally upwardly extending from the remote edge of said lower flange member, thereby preventing the lines from falling between said lower flange member and the wall member.

3. The work station of claim 1 wherein said flexible upper flange member is spaced apart from said wall member a distance less than the smallest diameter of lines run between said flexible upper flange member and said wall member, said flexible upper flange member pinching the lines against said wall member to prevent the lines from freely moving between said upper flange member and said wall member.

4. The work station of claim 1 wherein said flexible upper flange member abuts said wall member and pinches the lines against said wall member to prevent the lines from freely moving between said upper flange member and said wall member.

5. The work station of claim 1 wherein said lower flange members has a plurality of openings therein, whereby selected ones of the lines are receivable through selected ones of said openings to run the lines to respective selected areas.

6. The work station of claim 5 wherein said flexible upper flange member is slightly spaced apart from said wall member a distance less than the smallest diameter of lines run between said flexible upper flange member and said wall member, said flexible upper flange member pinching the lines against said wall member to prevent the lines from freely moving between said upper flange member and said wall member.

7. The work station of claim 6 wherein said line supporting trough is attached to said edge portion, and further including a rim member generally upwardly extending from the remote edge of said lower flange member, thereby preventing lines from falling between said lower flange member and said wall member.

8. The work station of claim 7 wherein said line supporting trough and said flanges are integral.

9. The work station of claim 7 wherein said line supporting trough, said upper flange member, and said lower flange member are coextruded from respective plastic materials, said lower flange member being extruded from a rigid plastic material and said upper flange member being extruded from a flexible plastic material.

10. The work station of claim 9 wherein said rigid plastic material is rigid polyvinyl chloride and said flexible plastic material is flexible polyvinyl chloride.

11. The work station of claim 5 wherein said wall member includes a vertical groove and wherein one of said openings coincides with said groove, whereby a line can be run vertically in said groove and directly into said one opening substantially hidden from view.

12. For use with a work platform having a top surface and an edge, and a wall member spaced apart from a portion of the edge, a line manager, comprising:
 a first support member adapted to be attached to a wall member,
 a rigid lower flange member connected to said first support member, and adapted to extend between the edge portion and the wall member,
 a second rigid support member connected to said rigid lower flange member and extending upwardly therefrom closely adjacent said edge portion,
 a flexible upper flange member connected to said second support member, and adapted to extend toward the wall member, said flexible flange member forming an unbroken coplanar surface with said work surface, whereby a plurality of appliance electrical lines, data cables and the like can be passed between said upper flexible flange member and the wall member and run along the length of said rigid lower flange member to selected areas.

13. The line manager of claim 12 wherein said support member, said upper flange member, and said lower flange member are coextruded from respective plastic materials, said upper flange member being extruded from a flexible plastic material, and said support member and said lower flange member being extruded from a rigid plastic material.

14. The line manager of claim 13 wherein said rigid plastic material is rigid polyvinyl chloride and said flexible plastic material is flexible polyvinyl chloride.

15. The line manager of claim 12 wherein said lower flange member has a plurality of openings therein, whereby selected lines are receivable through selected ones of said openings.

16. The line manager of claim 12 wherein said flexible upper flange member is adapted to be slightly spaced apart from the wall member a distance less than the smallest diameter of the lines run between said flexible upper flange member and the wall member, said flexible upper flange member being adapted to pinch the lines against the wall member to prevent the lines from freely moving between said flexible upper flange member and the wall member.

* * * * *